Figure 1:
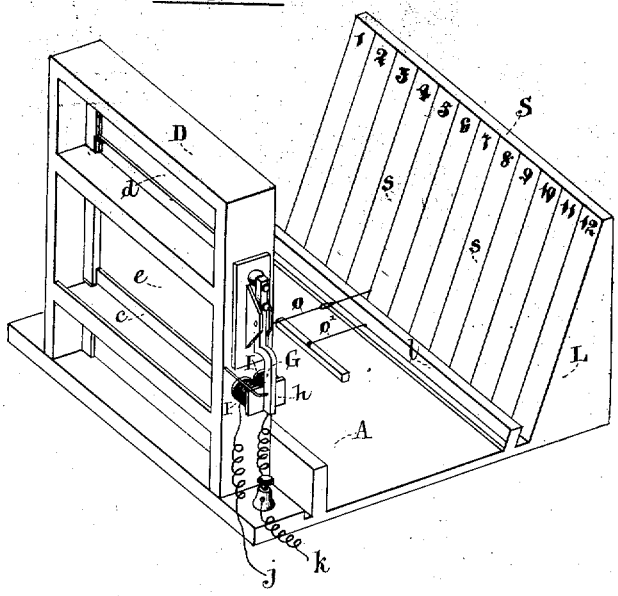

2 Sheets—Sheet 1.

E. J. MUYBRIDGE.

METHOD OF AND APPARATUS FOR PHOTOGRAPHING OBJECTS IN MOTION.

No. 9,960. Reissued Dec. 6, 1881.

*Witnesses:-*
T. Keane
Jas. R. Bowen.

*Inventor:-*
Edward J. Muybridge
By his Attorney
Edwin H. Brown.

2 Sheets—Sheet 2.

E. J. MUYBRIDGE.

METHOD OF AND APPARATUS FOR PHOTOGRAPHING OBJECTS IN MOTION.

No. 9,960. Reissued Dec. 6, 1881.

Witnesses:
T. J. Keane
Jas. R. Bowen.

Inventor:
Edward J. Muybridge
By his attorney,
Edwin H. Brown

UNITED STATES PATENT OFFICE.

EDWARD J. MUYBRIDGE, OF SAN FRANCISCO, CALIFORNIA.

METHOD OF AND APPARATUS FOR PHOTOGRAPHING OBJECTS IN MOTION.

SPECIFICATION forming part of Reissued Letters Patent No. 9,960, dated December 6, 1881.

Original No. 212,865, dated March 4, 1879. Application for reissue filed September 7, 1881.

*To all whom it may concern:*

Be it known that I, EDWARD J. MUYBRIDGE, of the city and county of San Francisco, State of California, have invented certain Improvements in Taking Instantaneous Photographs of Objects in Motion; and I do hereby declare that the following is a full, clear, and exact description thereof, reference being had to certain drawings accompanying this specification, and forming a part of the same.

My invention has reference to that branch of photography which is usually known as "instantaneous" photography, and it applies more particularly where the object to be photographed is in rapid motion.

One of the principal objects which I have in view is to take photographic views of horses that are moving rapidly under speed, in order to determine the posture, position, and relation of their limbs in different portions of their step or stride. It is often very desirable to photograph such a changing or moving object in its different changes or positions.

My improvements consist in the combination, with a photographic camera, of a shutter for controlling the exposure of a photographic plate in the camera to the object to be photographed, an electric circuit and appurtenances for controlling the operation of the shutter, and means adapted to be operated by the change of movement of the object to be photographed, and to act through the electric circuit and its appurtenances for the purpose of controlling the operation of the shutter.

They further consist in the combination, with a photographic camera, of a shutter for controlling the exposure of a photographic plate in the camera to the object to be photographed, and means adapted to be operated by the change or movement of the said object to effect the opening of the shutter, so that the said plate will be exposed.

They further consist in certain novel mechanism whereby the shutter of a camera is operated. They further involve the method of photographing a changing or moving object in different changes or positions, consisting in arranging a number of cameras in suitable position to operate on such object, and in making successive momentary exposures of photographic plates within the cameras, so that the cameras will operate one after another upon the object.

They also consist in a peculiar background for the object to be photographed.

Figure 2:
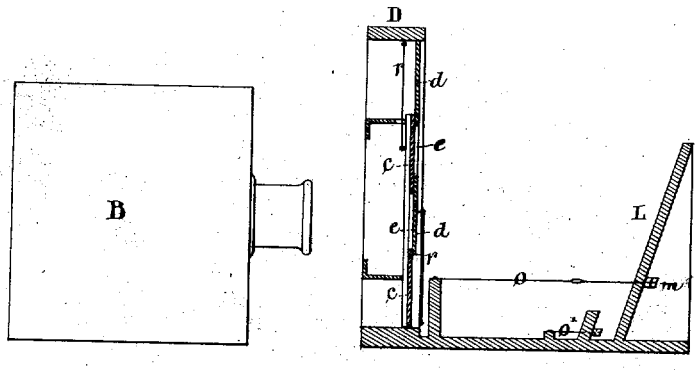
Figure 3:
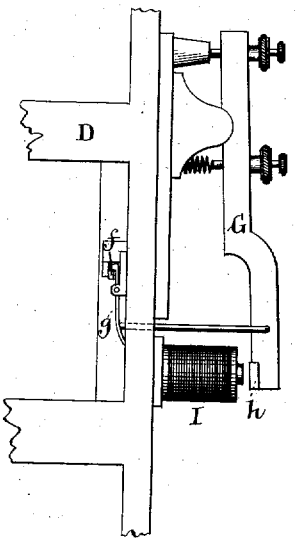
Figure 4:
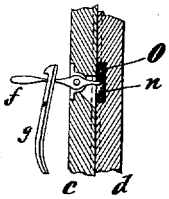
Figure 5:
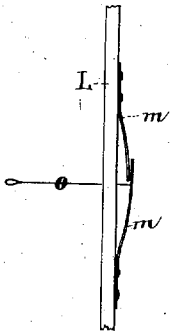
Figure 6:
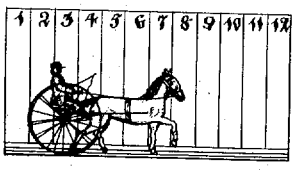

In the accompanying drawings, Figure 1 is a perspective view of a frame provided with a shutter for a camera, and also of a track along which a horse is made to pass, and of a background, the track and background being made disproportionate to the size of the said frame and shutter, so as to economize space while clearly illustrating my improvements. Fig. 2 is a transverse section of the said frame for the camera, its shutters, the track, and the background, and a side view of the camera, all parts being here shown as of about the same relative proportions as in the said Fig. 1. Fig. 3 is a back view of a portion of the frame, which is provided with the shutter, including certain of its appurtenances. Fig. 4 is a transverse section, illustrating certain parts whereby the slides of the shutter are retained in position to expose the photographic plate in a camera. Fig. 5 is an edge view of a portion of the background, including certain contact-plates which are employed in connection therewith; and Fig. 6 represents a photograph taken in connection with the background before referred to.

Let A represent the roadway or track along which the horse is made to pass under speed. On one side of the track I place the photographic camera B, the lens-tube of which is directed toward the roadway or track. Immediately in front of the camera lens-tube I place the frame D, in which the double-acting slides *c d*, forming the shutter, are arranged. The two slides of the shutter are mounted in the said frame, one forward of the other, in parallel planes in front of the camera lens-tube. Each slide has an opening, *e*, in it, which will usually be as wide as the diameter of the camera-tube; but in some instances I shall make it less. The slide *c* is connected by one or more springs, *r*, with the top of the frame D, while the slide *d* is similarly connected with the bottom of the frame. When the two slides are drawn to their respective inactive positions against the resilience of the aforesaid springs the solid portions of the slides cover the end of the camera lens-tube. To set the slides in this relation to each other, the slide *c* is drawn down and the slide *d* is drawn up until the openings *e* pass each other and the solid portions together cover the end of the camera-tube. In doing this the springs *r* are distended and exert a tendency to readjust the slides to their former positions. Both slides are secured by a single lever, *f*, and trigger *g*. The lever is pivoted near the forward end to the slide *c*, and at the forward end engages with a notch, *n*, in a plate, O, which is affixed to the slide *d*. The rear end of the lever catches lightly under the hooked end of the trigger *g*, and is thereby held so as to retain the slides in position. The opposite end of the trigger is connected with a lever, G, which is pivoted at its middle to the outside of the frame. The lower end of the lever G carries an armature, *h*. I I are electro-magnets, which are attached to the side of the frame under the armature. A wire, *j*, leads from these magnets to the battery, which may be conveniently located, while another wire, *k*, leads from said magnets and extends across the track, either underground or overhead, as hereinafter explained.

The background L is placed on the side of the track or roadway opposite that on which the camera and slides constituting the shutter are located, so that the horse must pass between them. I prefer to paint this background white, so that the horse will stand out in better relief, and his position and posture be more distinctly shown in the photograph. I may also whiten the track between the camera and background. Near the bottom of this background I paint or otherwise delineate several lines or stripes, *l l*, at different calculated spaces apart, so that the distance of the horse's feet from the ground at the instant the photograph is taken will be shown upon the picture by the position of the feet with relation to the lines.

On the rear side of the background I secure two metallic spring-plates, *m m*, so that one will be slightly distant from the other. The wire *j*, which leads from the magnets I to the battery, leads from the battery to one of the spring-plates *m m*, and the wire *k* leads to the other of these spring-plates. A strong thread, *o*, is attached to the outside plate *m* and stretched across the track at the proper height, so that a horse will run against and break it as he passes. The strain upon the thread when the horse runs against it will draw the outer plate *m* against the under plate and complete the circuit, thus electrifying the magnets, so that the armature will be drawn against them and release the trigger. The instant the trigger is released the springs *r* draw the slides *c d* of the shutter in opposite directions, so that the sensitive plate in the camera is exposed for a space of time more or less brief as the openings *e* pass each other. The camera is so located with reference to the slides of the shutter that it is directly opposite the openings when they coincide with each other, so that an exposure is had.

For a horse harnessed to a sulky or vehicle I operate the outer spring-plate, *m*, to make the connection with the under one by causing one of the wheels of the sulky or vehicle to pass over the connection that draws the plates together.

In order to take several successive views, I employ a number of cameras and shutters in connection with a single background of the required length. In this case I place the cameras at intervals apart and make a separate circuit and operating device for each. I also paint or otherwise mark the background with lines *s s*, at regular intervals apart, and number them successively by painting the numerals upon them. These lines will then show the position and progress of the horse and his posture at each exposure.

What I claim as my invention, and desire to secure by Letters Patent, is—

1. The combination, with a photographic camera, of a shutter for controlling the exposure of a photographic plate in the camera to the object to be photographed, an electric circuit and appurtenances for controlling the operation of the shutter, and means adapted to be operated by the movement of the object to be photographed, and to act through the electric circuit and its appurtenances for the purpose of controlling the operation of the shutter, substantially as specified.

2. The combination, with a photographic camera, of a shutter for controlling the exposure of a photographic plate in the camera to the object to be photographed, and means adapted to be operated by the change or movement of the object to be photographed to effect the opening of the shutter, so that said plate will be exposed, substantially as specified.

3. The slides *c d*, set by means of the lever *f*, trigger *g*, and centrally-pivoted lever G, with its armature *h*, in combination with the electro-magnets I I, wires *j k*, and metallic spring-plates *m m*, constructed to operate substantially as and for the purpose described.

4. The method of photographing a changing or moving object in different changes or positions, consisting in arranging a number of cameras in suitable positions to operate on such object, and in making successive momentary exposures of photographic plates within the cameras, so that the cameras will operate one after another upon the object, substantially as specified.

5. The background L, provided with vertical lines or gage-stripes *s* and horizontal stripes or lines *l*, arranged substantially as shown and described, for the purpose of obtaining horizontal and vertical measurements of the passing object, as set forth.

EDW. J. MUYBRIDGE.

Witnesses:
EDWIN H. BROWN,
T. J. KEANE.